(12) United States Patent
Johansson et al.

(10) Patent No.: US 9,473,491 B1
(45) Date of Patent: Oct. 18, 2016

(54) COMPUTING DEVICE WITH INTEGRATED AUTHENTICATION TOKEN

(71) Applicant: Amazon Technologies, Inc., Seattle, WA (US)

(72) Inventors: Jesper Mikael Johansson, Redmond, WA (US); Darren Ernest Canavor, Redmond, WA (US); Matthew Ryan Jezorek, Maple Valley, WA (US); Brian Young Lee, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/572,739

(22) Filed: Dec. 16, 2014

(51) Int. Cl.
*H04L 29/06* (2006.01)
*G06F 21/31* (2013.01)

(52) U.S. Cl.
CPC .......... *H04L 63/0838* (2013.01); *G06F 21/31* (2013.01)

(58) Field of Classification Search
CPC .................................................. H04L 63/0838
USPC ......................................................... 726/9
See application file for complete search history.

(56) References Cited

U.S. PATENT DOCUMENTS

| | | | | | |
|---|---|---|---|---|---|
| 5,835,722 | A | * | 11/1998 | Bradshaw | G06F 17/30867 707/E17.109 |
| 5,880,523 | A | * | 3/1999 | Candelore | G06F 21/86 257/679 |
| 6,233,339 | B1 | * | 5/2001 | Kawano | G06F 21/87 380/44 |
| 9,237,305 | B2 | * | 1/2016 | Guzman | H04N 7/15 |
| 2009/0146267 | A1 | * | 6/2009 | Peytavy | H01L 23/576 257/659 |
| 2015/0039803 | A1 | * | 2/2015 | Yamamoto | G06F 5/085 710/308 |

OTHER PUBLICATIONS

Henning et al. ("WO 2009-038446": A portable security identity and mass storage unit—"Mar. 26, 2009").*

* cited by examiner

*Primary Examiner* — Longbit Chai
(74) *Attorney, Agent, or Firm* — Thomas | Horstemeyer, LLP

(57) ABSTRACT

Disclosed are various embodiments for a computing device with an integrated authentication token. The computing device includes first circuitry having a processor and a memory and providing general-purpose computing capability. The computing device also includes second circuitry configured to generate a one-time password. The first circuitry is incapable of determining the one-time password due to a hardware, communicative, and/or electrical separation, and the first and second circuitry are in a single enclosure.

20 Claims, 7 Drawing Sheets

COMPUTING DEVICE WITH INTEGRATED AUTHENTICATION TOKEN

BACKGROUND

An authentication token is a device given to a user to assist the user in proving his or her identity electronically. The authentication token may generate one-time passwords. For example, the authentication token may generate a code periodically based on an initialization vector and timing information. To illustrate the use of an authentication token, suppose that to access a secured resource (e.g., a virtual private network, a secured network site, etc.), a user is requested to supply a username and a password. However, the username and password may be compromised, potentially through no fault of the user. In addition, if the user is requested to provide a code generated by the authentication token, it may be assumed that the user has the authentication token in his or her physical possession and is not a malicious user who has gained access only to the username and password.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present application relates to a computing device with an integrated authentication token. Authentication tokens have become popular in recent years as an element of multi-factor authentication. In addition to identifying a user by what the user knows, physical authentication tokens allow for identification of a user by what the user has in his or her possession. Typically, authentication tokens are distributed as separate devices in the form of a key fob. When a user authenticates via a computing device, the user will look at the key fob to see the current code displayed by the key fob. The user then enters this code via a user interface of the computing device to perform authentication. Such an approach may be frustrating, as the user may have to obtain the key fob from another room, or the code may expire between the time the user sees it and enters it via the computing device.

An alternative may be to use a "soft token," or a token generated by logic executed by the computing device. However, if the computing device is compromised, the token may be accessed by a malicious user as well. In such a situation, using a soft token may offer little to no additional security over passwords and other credentials that may be intercepted by a malicious user. Some approaches may execute the soft token logic within a sandbox, or a protected environment. Unfortunately, sandboxes may be vulnerable to attacks. A risk may exist when soft tokens are used.

Various embodiments of the present disclosure provide a computing device with an integrated authentication token implemented in hardware. A separation (e.g., a hardware separation, communicative separation, and/or electrical separation) between the integrated authentication token and the general-purpose processor of the computing device helps ensure that the general-purpose processor will not be able to obtain codes generated by the token, even if the computing device were compromised. For simplicity, the authentication token may be coupled to a shared display that is also used by the general-purpose processor.

Figure 1:
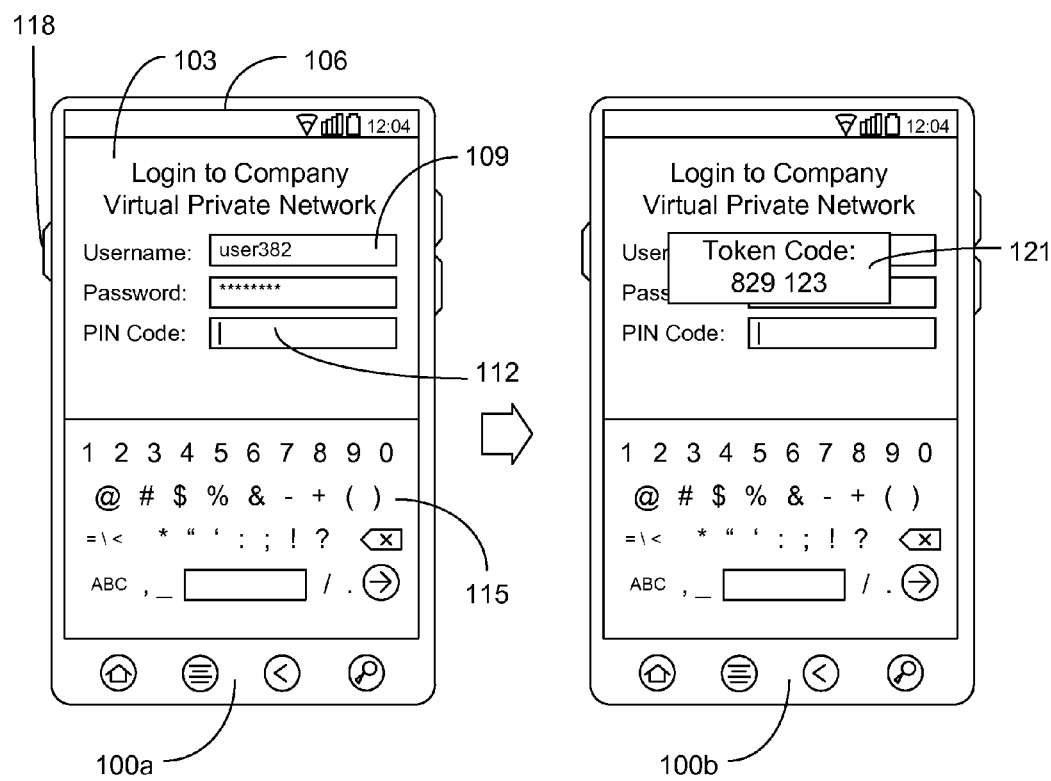
FIG. 1 is a diagram illustrating a non-limiting example of use of a computing device with an integrated authentication token in accordance with an embodiment of the present disclosure.

With reference to FIG. 1, shown is a diagram illustrating a non-limiting example of use of a computing device with an integrated authentication token in accordance with an embodiment of the present disclosure. In FIG. 1, a mobile device 100a is shown. A user interface 103 is rendered upon the display 106 of the mobile device 100a. The user interface 103 corresponds to a login screen for a mobile application, network page, or other secured resource (e.g., "Login to Company Virtual Private Network.") The user interface 103 includes multiple form fields 109 that request information that the user knows, such as username, password, etc. Moreover, the user interface 103 also includes a form field 112 requesting a code from the integrated authentication token of the mobile device 100a. In this example, the form field 112 has focus and the on-screen keyboard 115 appears. Also, in this example, the on-screen keyboard 115 is formatted for numeric inputs since the form field 112 requests numeric input.

In one embodiment, the on-screen keyboard 115 appears irrespective of what type of input is requested by the form field 112. In another embodiment, the form field 112 may provide a hint as to the type of input (e.g., metadata describing a possible set of characters that can make up the requested code). Such sets of characters may comprise numeric only, alphanumeric, special characters, and/or other sets of characters. In still another embodiment, the hardware token itself provides a hint as to the set of characters corresponding to the generated code. Providing a hint may make it slightly easier for the customer, especially on devices having limited screen real estate, where input via a touch screen can be difficult.

The mobile device 100a also includes a button 118 configured to activate the integrated authentication token, thereby causing a code to be rendered upon the display 106. Referring now to mobile device 100b, the button 118 of mobile device 100a has been pressed, and the integrated authentication token has been activated. Consequently, a token user interface 121 is rendered upon the display 106.

The token user interface 121 presents a current code usable for entry into the form field 112. The user is able to see the current code and easily enter it via the keyboard 115 into the text entry form field 112. The token user interface 121 as depicted in FIG. 1 is shown as opaque, but it is understood that the token user interface 121 may be partially transparent in some embodiments. Although the token user interface 121 is shown on the same display 106 as the user interface 103, the integrated authentication token may otherwise be decoupled from the general-purpose computing hardware of the mobile device 100b. Thus, the general-purpose computing hardware cannot access the current code.

In the following discussion, a general description of the system and its components is provided, followed by a discussion of the operation of the same.

Figure 2:
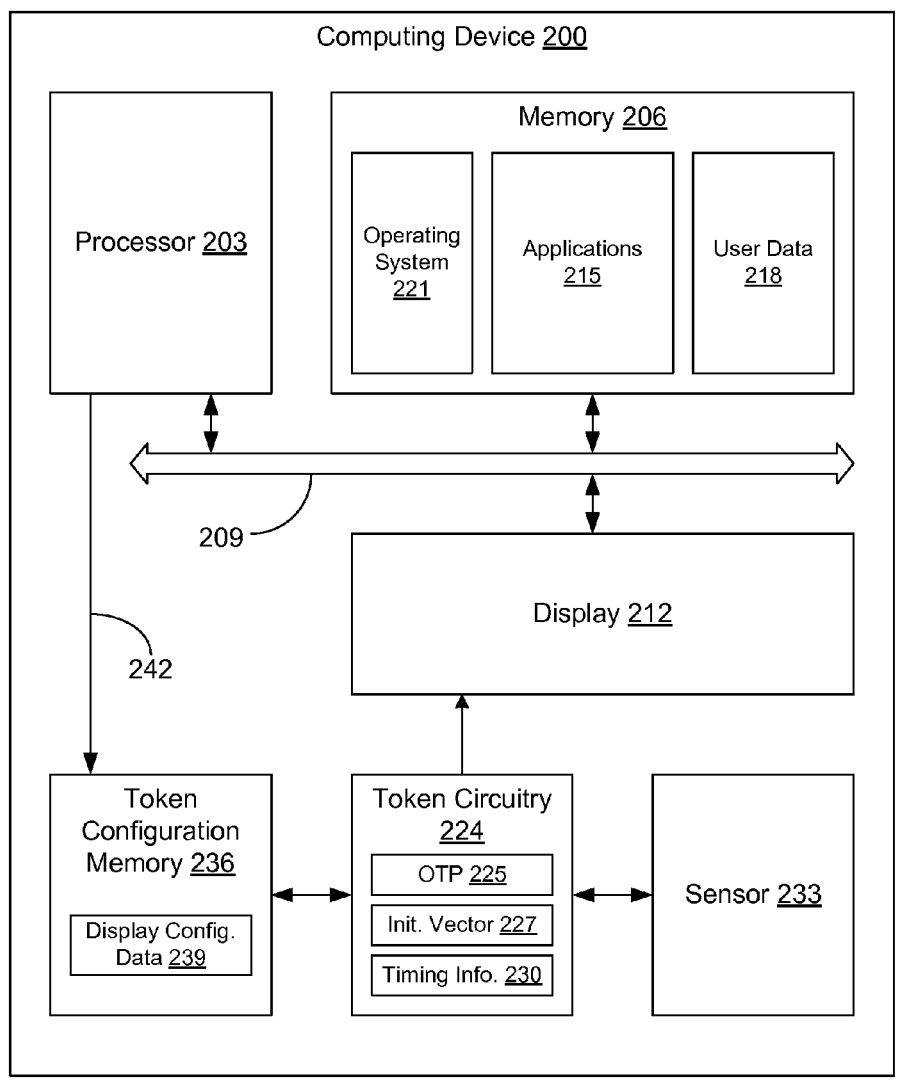
FIG. 2 is a schematic block diagram of a computing device according to various embodiments of the present disclosure.

Turning now to FIG. 2, shown is a schematic block diagram of a computing device 200 according to various embodiments of the present disclosure. Such a computing device 200 may be embodied in the form of a desktop computer, a laptop computer, personal digital assistants, cellular telephones, smartphones, set-top boxes, music players, web pads, tablet computer systems, game consoles, electronic book readers, wearable computing devices, smart watches, optical head mounted computing systems, point-of-sale devices, payment card readers (e.g., magnetic stripe card reader, chip-and-pin card reader, a device that plugs into an audio jack of a mobile device and reads the magnetic stripe of a payment instrument, etc.), automated teller machines, vending machines, kiosks, or other computing devices. It is noted that entire contents of the computing device 200 may be contained within a single enclosure. For example, the enclosure may be of plastic, metal, and/or glass construction and include one or more printed circuit boards. The enclosure may be of a handheld size (e.g., three inches by eight inches, or similar sizes), a tablet size, a laptop size, and/or other sizes.

The computing device 200 includes at least one processor circuit for general-purpose computing capability, for example, having a processor 203 and a memory 206, both of which are coupled to a local interface 209. The local interface 209 may comprise, for example, a data bus with an accompanying address/control bus or other bus structure as can be appreciated. The computing device 200 may include a display 212, also coupled to the local interface 209. The display 212 may comprise, for example, one or more devices such as liquid crystal display (LCD) displays, gas plasma-based flat panel displays, organic light emitting diode (OLED) displays, electrophoretic ink (E ink) displays, LCD projectors, or other types of display devices, etc. The display 212 may correspond to a touchscreen. In one embodiment, the display 212 is a multi-layer display, with two or more independently controlled layers.

Stored in the memory 206 are both data and several components that are executable by the processor 203. In particular, stored in the memory 206 and executable by the processor 203 are applications 215. Non-limiting examples of applications 215 may include browsers, email applications, social networking applications, word processors, spreadsheet applications, game applications, payment applications, password management applications, and/or other applications. Also stored in the memory 206 may be user data 218 and other data. In addition, an operating system 221 may be stored in the memory 206 and executable by the processor 203.

The computing device 200 further includes token circuitry 224 corresponding to an integrated authentication token. The token circuitry 224 is configured to generate a one-time password 225 such as a numerical code. The token circuitry 224 may be configured to generate the one-time password 225 periodically (e.g., every minute). In some cases, the token circuitry 224 may be configured to generate the one-time password 225 in response to user input. The token circuitry 224 may generate the one-time password 225 based at least in part on an initialization vector 227 and timing information 230. In one embodiment, an identifier corresponding to at least a portion of the initialization vector 227 may be located on an exterior surface of the computing device 200, similarly to a serial number. The token circuitry 224 may comprise an application-specific integrated circuit (ASIC), a field-programmable gate array (FPGAs), a complex programmable logic device (CPLD), and/or other hardware logic. The token circuitry 224 may include a trusted platform module (TPM), but unlike conventional uses of TPMs, the processor 203 may have no ability to read data from the TPM.

The token circuitry 224 may be coupled to the display 212 such that the token circuitry 224 may render a token user interface 121 (FIG. 1) upon the display 212. For example, the token circuitry 224 may be coupled to the display 212 by way of a separate interface than the local interface 209. In one embodiment, the token circuitry 224 may have the capability to render to an upper layer of the display 212, while the processor 203 renders to a lower layer of the display 212. For example, the upper layer may comprise a different LCD array that may filter light that passes through the lower layer. The upper layer may be opaque or partially transparent with respect to the lower layer. The token circuitry 224 may have the capability to render to the full screen of the display 212 or a predefined portion of the display 212.

The token circuitry 224 may be coupled to one or more sensors 233 that may be used to enable or disable rendering of the token user interface 121. The sensors 233 may include push buttons, capacitive buttons, switches, accelerometers, etc. In one embodiment, a user touches a capacitive button and the token circuitry 224 then renders the token user interface 121 for a predefined period of time. In another embodiment, when a user executes a predefined pattern of motion for the computing device 200 detected by an accelerometer, the token user interface 121 is rendered. In yet another embodiment, a sensor 233 may have an ability to read the display 212 to determine whether a form field 112 (FIG. 1) requesting a code from the integrated authentication token is being shown. The token circuitry 224 may then trigger rendering of the token user interface 121 in response to detecting via the sensor 233 that the form field 112 is being shown. However, it may be desired that the sensor 233 be explicitly user activated to avoid potential attacks whereby the processor 203 is compromised and the user is deceptively prompted to enter the one-time password 225.

The token circuitry 224 may include, or be coupled to, a token configuration memory 236. The token configuration memory 236 may store various parameters that control the operation of the token circuitry 224. For example, the token configuration memory 236 may store a parameter that defines the amount of time that the token user interface 121 is to be rendered upon activation of the sensor 233. The token configuration memory 236 may, in particular, include display configuration data 239 that controls the visual presentation of the token user interface 121 and the one-time password 225. The display configuration data 239 may indicate where upon the display 212 the token user interface 121 is to be rendered, where upon the display 212 the token user interface 121 is not to be rendered, the size of the token user interface 121, colors used in the token user interface 121, fonts used in the token user interface 121, a shape of the token user interface 121, and/or other features relating to rendering of the token user interface 121.

In another embodiment, the token configuration memory 236 may store security credentials on behalf of the user. For example, the token configuration memory 236 may provide password management functionality that stores passwords, secrets, certificates, form field information (address, zip code, date of birth), personally identifiable information, and other information. Upon the user hitting a button 118 (FIG. 1), one or more types of stored information may be displayed in the token user interface 121 for the user to type the information into a form. In another embodiment, the password management functionality may be completely separate from the processor 203 and the memory 206 and/or the token circuitry 224 and the token configuration memory 236 for additional security. Hints could be provided to the password manager as to the nature of the form field (e.g., user name, password, address, etc.), and the user may be able to hit the button 118 and have the password manager automatically enter the data into the form field.

For example, techniques relating to security credential management are described by U.S. Patent Application entitled "AUTHENTICATION MANAGER" filed on Aug. 12, 2009, having application Ser. No. 12/539,886; U.S. Patent Application entitled "MANAGING SECURITY CREDENTIALS" filed on Jul. 29, 2011, having application Ser. No. 13/194,287; U.S. Patent Application entitled "ACCOUNT MANAGEMENT FOR MULTIPLE NETWORK SITES" filed on Feb. 1, 2012, having application Ser. No. 13/363,654; U.S. Patent Application entitled "AUTHENTICATION MANAGEMENT SERVICES" filed on Feb. 1, 2012, having application Ser. No. 13/363,664; U.S. Patent Application entitled "PRESENTING MANAGED SECURITY CREDENTIALS TO NETWORK SITES" filed on Feb. 1, 2012, having application Ser. No. 13/363,675; U.S. Patent Application entitled "RECOVERY OF MANAGED SECURITY CREDENTIALS" filed on Feb. 1, 2012, having application Ser. No. 13/363,681; U.S. Patent Application entitled "LOGOUT FROM MULTIPLE NETWORK SITES" filed on Feb. 1, 2012, having application Ser. No. 13/363,685; U.S. Patent Application entitled "MAPPING STORED CLIENT DATA TO REQUESTED DATA USING METADATA" filed on Nov. 16, 2012, having application Ser. No. 13/679,254, which are incorporated herein by reference in their entirety.

The processor 203 is not coupled to the token circuitry 224 so that the processor 203 does not have access to the one-time password 225 generated by the token circuitry 224. The separation may be physical, electrical, and/or communicative. To effect this separation, the electrical traces of the token circuitry 224 may be physically separated from components accessible by the processor 203 by a certain distance to avoid the possibility of data generated by the token circuitry 224 being read by the processor 203. The distance may be determined as a function of the electrical signals used between the token configuration memory 236, the token circuitry 224, and the sensor 233. That is, the distance between adjacent traces and components may be selected such that any electrical signals generated by the token configuration memory 236, the token circuitry 224, and the sensor 233 are not able to induce electrical signals in the processor 203, memory 206, or related components such that the processor 203 and the memory 206 can process the induced signals to derive the one-time password 225.

In some cases, the token circuitry 224 may be electromagnetically isolated from the processor 203 by a sufficient air gap or an electromagnetic shield configured to block stray emissions. In one embodiment, active circuitry may be used to cancel out any radiated electromagnetic fields (e.g., by generating electromagnetic interference that generates sufficient noise to effectively obfuscate any electromagnetic fields generated by the token configuration memory 236 and the token circuitry 224). Alternatively, such active circuitry may be tuned to specifically cancel any waves transmitted by the token configuration memory 236 or the token circuitry 224. Additional electromagnetic interference shielding may be provided around the processor 203, the memory 206, the token configuration memory 236, and/or the token circuitry 224 to compensate for the noise generated in the computing device 200.

Also, different types of media may be used to interconnect the processor 203 and the memory 206 as opposed to the token configuration memory 236 and the token circuitry 224. For example, electrical traces may be used for the processor 203 and the memory 206, while short range optical signals may be used for the token configuration memory 236 and the token circuitry 224. An optical signal may be generated by the token circuitry 224 that includes the one-time password 225 and may be routed to the display 212 via a waveguide. In addition, different communications protocols may be used for the processor 203 and the memory 206 as opposed to the token configuration memory 236 and the token circuitry 224 (e.g., I2C vs. UNI/O or 1-wire). In one embodiment, the token configuration memory 236 and the token circuitry 224 may be configured to periodically change their communication protocol.

In one embodiment, the processor 203 may be coupled to the token configuration memory 223 by way of a write-only channel 242. In another embodiment, the write-only channel 242 may present a data output to the token circuitry 224 so that the token circuitry 224 may directly read the data value from the processor 203. The write-only channel 242 may enable the processor 203 to set various configuration parameters in the token configuration memory 236. For example, the processor 203 may use the write-only channel 242 to cause the token user interface 121 to be rendered upon a specific portion of the display 212, not to cover a specific portion of the display 212, to have a particular formatting, and so on.

In one embodiment, the processor 203 may use the write-only channel 242 to cause the token circuitry 224 to render the token user interface 121, similarly to how activation of the sensor 233 may cause the token user interface 121 to be rendered. For example, the processor 203 may be configured to cause the token user interface 121 to be rendered when an application 215 renders a user interface 103 (FIG. 1) that elicits the one-time password 225. The arrangement of the user interface 103 may be based at least in part on the location of the token user interface 121, or the location of the token user interface 121 may be based at least in part on the arrangement of the user interface 103. However, it is noted that an ability to cause the token user interface 121 to be rendered does not provide the processor 203 with the capability to access or read the one-time password 225 from the token circuitry 224. In one embodiment, the processor 203 may use the write-only channel 242 to wipe or reset the token circuitry 224.

Figure 3:
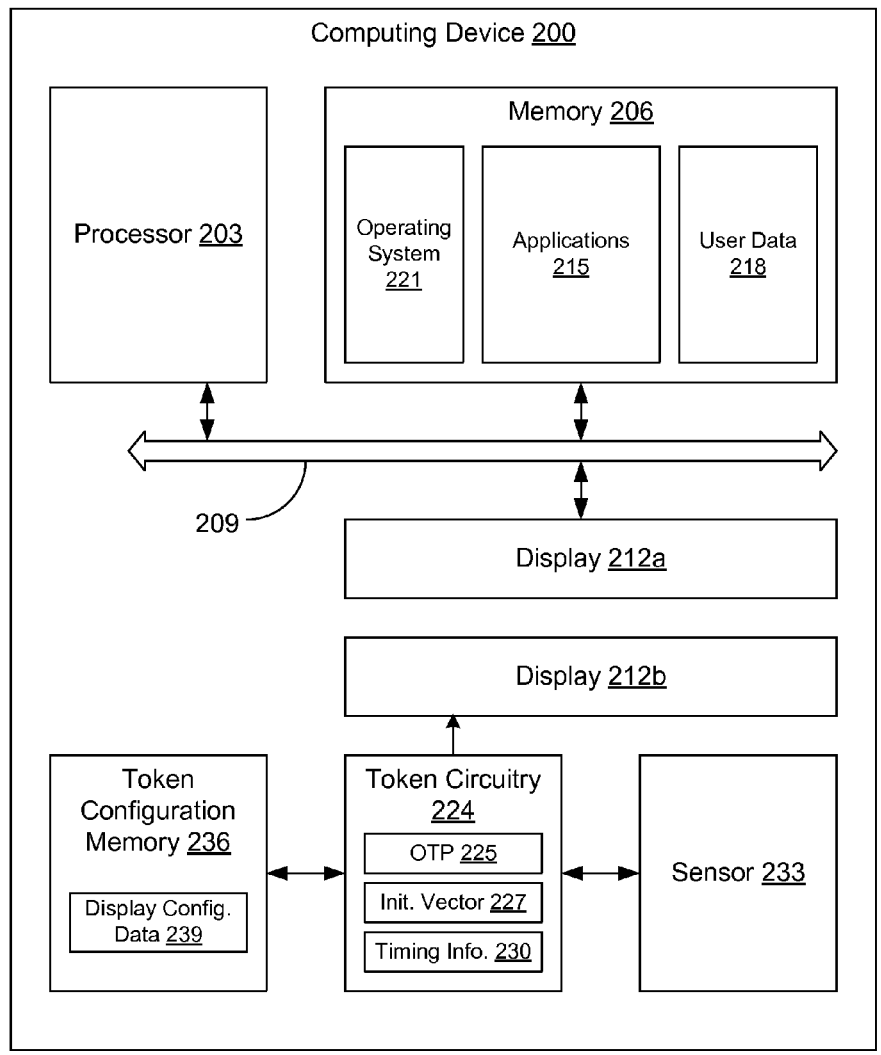
FIG. 3 is a schematic block diagram of a computing device according to another embodiment of the present disclosure.

Moving on to FIG. 3, shown is a schematic block diagram of a computing device 200 according to another embodiment of the present disclosure. In the embodiment of FIG. 3, the shared display 212 has been separated into multiple displays 212a and 212b. The display 212a corresponds to the primary device display that is used by the general-purpose processor 203 to render user interfaces 103 (FIG. 1). The display 212b corresponds to a special purpose display that is used by the token circuitry 224 to render the token user interface 121 (FIG. 1). Also, in some embodiments as pictured in FIG. 3, the write-only channel 242 (FIG. 2) may be absent, thereby effecting a complete communicative separation between the token circuitry 224 and the general-purpose processor 203. In one embodiment, an optical signal may be generated by the token circuitry 224 and routed to the display 212*b* via a waveguide or light pipe.

Figure 4:
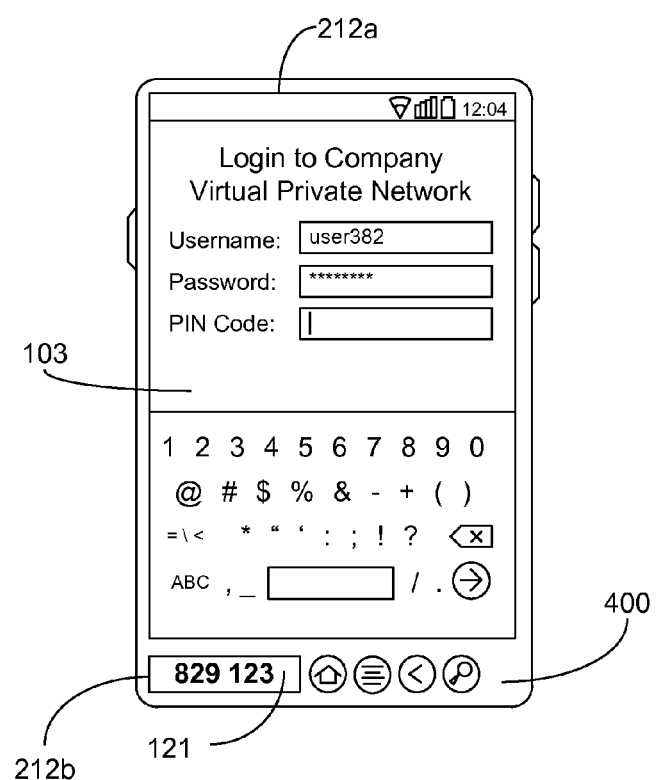
FIG. 4 is a drawing of one example of a mobile device corresponding to the computing device of FIG. 3.

Referring next to FIG. 4, shown is a drawing of one example of a mobile device 400 corresponding to the computing device 200 of FIG. 3. The mobile device 400 has two displays: display 212*a* and display 212*b*. The display 212*a* is configured to render the user interface 103, while the display 212*b* is configured to render the token user interface 121.

Figure 5:
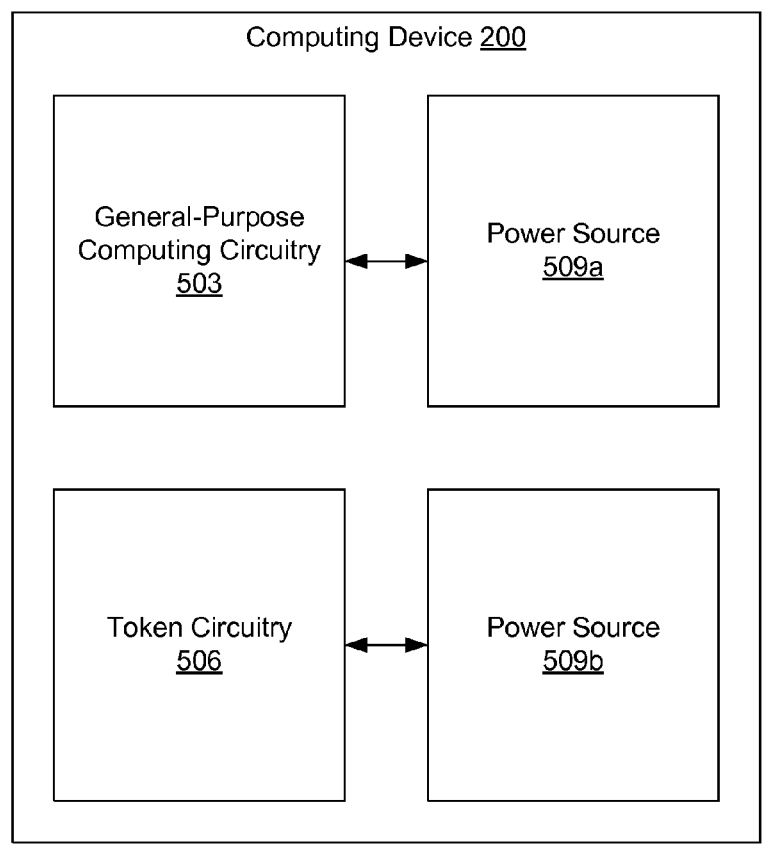
FIG. 5 is a schematic block diagram of an example alternative view of the computing device of FIG. 2 or 3 according to various embodiments of the present disclosure.

Continuing to FIG. 5, shown is a schematic block diagram of an example alternative view of the computing device 200 of FIG. 2 or 3 according to various embodiments of the present disclosure. In FIG. 5, the components of the computing device 200 have been divided into general-purpose computing circuitry 503 and token circuitry 506. The general-purpose computing circuitry 503 may include the processor 203 (FIGS. 2 & 3), the memory 206 (FIGS. 2 & 3), the display 212*a* (FIG. 3), the local interface 209 (FIGS. 2 & 3), and/or other components. The token circuitry 506 may include the token circuitry 224 (FIGS. 2 & 3), the token configuration memory 236 (FIGS. 2 & 3), the sensor 233 (FIGS. 2 & 3), the display 212*b* (FIG. 3), and/or other components.

Two distinct power sources may be employed: power source 509*a* for the general-purpose computing circuitry 503, and power source 509*b* for the token circuitry 506. This facilitates a further decoupling between the general-purpose computing circuitry 503 and the token circuitry 506. Such a decoupling may be desired to avoid potential attacks relating to the general-purpose computing circuitry 503 being able to determine how much power is being utilized by the token circuitry 506. In one scenario, an attacker may be able to infer a one-time password 225 (FIGS. 2 & 3) or other parameters, or at least limit the possibilities for the one-time password 225, based at least in part on the power draw of the token circuitry 506.

In other embodiments, a shared power source may be employed for both the general-purpose computing circuitry 503 and the token circuitry 506. In some cases, the connections of the general-purpose computing circuitry 503 and/or the token circuitry 506 to the shared power source may be isolated via capacitors, optical isolators, transformers, and/or other components in an attempt to obscure the power consumption patterns of the token circuitry 506.

The power source 509*a* may correspond to a direct current input, a lithium-ion rechargeable battery, and/or other types of power sources. The power source 509*b* may be relatively lower powered as compared to the power source 509*a*. For example, the power source 509*b* may correspond to a button-type battery, a solar panel, a vibration-powered generator, a receiver for ambient electromagnetic radiation, and/or other types of power sources.

In one embodiment, the display 212*b* may be a low-powered E ink-type display that requires power only to change the display, not to maintain it. Given that the token circuitry 224 may consume very little power as well, the energy supplied merely from moving the computing device 200 around or from stray electromagnetic radiation sources may be sufficient to power the token circuitry 506.

Figure 6:
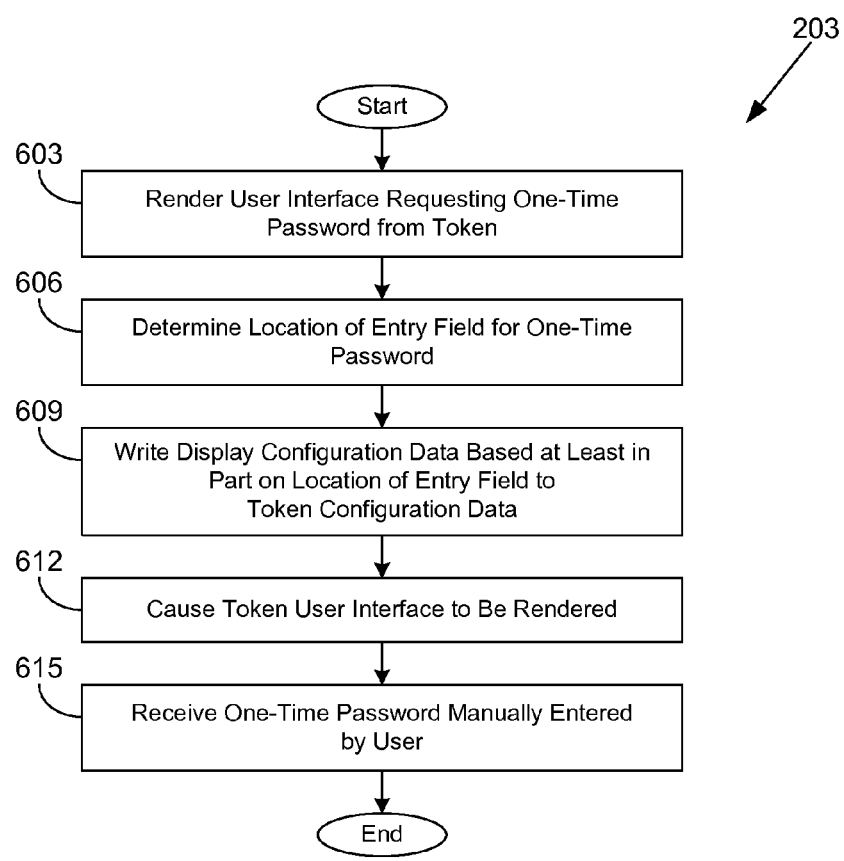
FIG. 6 is a flowchart illustrating one example of functionality implemented as portions of a processor in the computing device of FIG. 2 or 3 according to various embodiments of the present disclosure.

Referring next to FIG. 6, shown is a flowchart that provides one example of the operation of a portion of the processor 203 according to various embodiments. It is understood that the flowchart of FIG. 6 provides merely an example of the many different types of functional arrangements that may be employed to implement the operation of the portion of the processor 203 as described herein. As an alternative, the flowchart of FIG. 6 may be viewed as depicting an example of elements of a method implemented in the computing device 200 (FIGS. 2 & 3) according to one or more embodiments.

Beginning with box 603, the processor 203 renders a user interface 103 (FIG. 1) upon the display 212 (FIGS. 2 & 3) requesting that a user provide a one-time password 225 (FIGS. 2 & 3) from an authentication token. For example, the user may use an application 215 (FIGS. 2 & 3) that is a browser to access a network page requesting the one-time password 225 as an authentication factor. Alternatively, the user may use a dedicated application 215 that requests the one-time password 225 as an authentication factor. The user interface 103 may include a form field 112 (FIG. 1) for entering the one-time password 225.

In box 606, the processor 203 determines the location of the form field 112 to be used for entering the one-time password 225. For example, the processor 203 may determine that the form field 112 is located at a certain X and Y pixel offset upon the display 212 and has a certain width and height. In box 609, the processor 203 may write display configuration data 239 (FIG. 2) to the token configuration memory 236 (FIG. 2) via the write-only channel 242 (FIG. 2). This display configuration data 239 may be based at least in part on the location of the form field 112.

In box 612, the processor 203 causes the token user interface 121 (FIG. 1) to be rendered upon the display 212. Alternatively, the user may activate the sensor 233 (FIGS. 2 & 3), thereby causing the token user interface 121 to be rendered. In some embodiments (e.g., FIG. 3), a separation between the processor 203 and the token circuitry 224 may make it impossible for the processor 203 itself to cause the token user interface 121 to be rendered. In box 615, the processor 203 receives the one-time password 225 as manually entered by the user. For example, the user may type the one-time password 225 via an on-screen keyboard 115 (FIG. 1), dictate the one-time password 225 via a voice recognition interface, or provide the one-time password 225 via another approach. Upon receiving the one-time password 225, the application 215 may transmit the one-time password 225 to a network service to authenticate in order to access a secured resource. Thereafter, the operation of the portion of the processor 203 ends.

Figure 7:
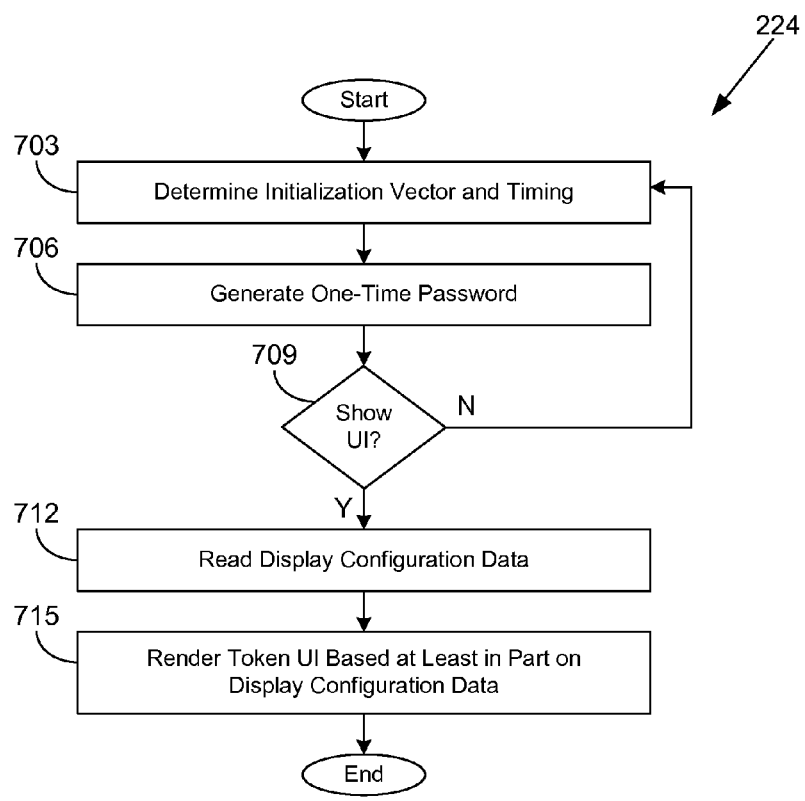
FIG. 7 is a flowchart illustrating one example of functionality implemented as portions of token circuitry in the computing device of FIG. 2 or 3 according to various embodiments of the present disclosure.

Moving on to FIG. 7, shown is a flowchart that provides one example of the operation of a portion of the token circuitry 224 according to various embodiments. It is understood that the flowchart of FIG. 7 provides merely an example of the many different types of functional arrangements that may be employed to implement the operation of the portion of the token circuitry 224 as described herein. As an alternative, the flowchart of FIG. 7 may be viewed as depicting an example of elements of a method implemented in the computing device 200 (FIGS. 2 & 3) according to one or more embodiments.

Beginning with box 703, the token circuitry 224 determines an initialization vector 227 (FIGS. 2 & 3) and timing information 230 (FIGS. 2 & 3). The timing information 230 may be generated by a clock internal to the token circuitry 224. In box 706, the token circuitry 224 generates a one-time password 225 (FIGS. 2 & 3) based at least in part on the initialization vector 227 and the timing information 230. In box 709, the token circuitry 224 determines whether to show the token user interface 121 (FIG. 1). For example, the user may activate the sensor 233 (FIGS. 2 & 3) or the processor 203 (FIGS. 2 & 3) may request that the token user interface 121 be shown via the write-only channel 242 (FIG. 2).

If the token user interface 121 is not to be shown, the token circuitry 224 may move from box 709 back to box 703 or box 706 and continue periodically regenerating the one-time password 225 according to a predefined interval. If the token user interface 121 is to be shown, the token circuitry 224 instead moves from box 709 to box 712. In box 712, the token circuitry 224 may read the display configuration data 239 (FIGS. 2 & 3) and/or other information from the token configuration memory 236 (FIGS. 2 & 3).

In box 715, the token circuitry 224 renders the token user interface 121 presenting the current one-time password 225 upon the display 212 (FIGS. 2 & 3). The token user interface 121 may be customized based at least in part on the display configuration data 239; for example, so the token user interface 121 does not overlap and obscure the form field 112 (FIG. 1) through which the application 215 (FIGS. 2 & 3) elicits the one-time password 225 from the user. In other examples, the token user interface 121 may be rendered at a predefined location without regard to the location of the form field 112. Alternatively, the processor 203 may render an arrangement of the user interface 103 (FIG. 1) based at least in part on the location of the token user interface 121. For example, the user interface 103 may be arranged such that an on-screen keyboard or form field 112 are not obscured. Thereafter, the operation of the portion of the token circuitry 224 ends.

Referring back to FIGS. 2 & 3, it is understood that there may be other applications that are stored in the memory 206 and are executable by the processor 203 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 206 and are executable by the processor 203. In this respect, the term "executable" means a program file that is in a form that can ultimately be run by the processor 203. Examples of executable programs may be, for example, a compiled program that can be translated into machine code in a format that can be loaded into a random access portion of the memory 206 and run by the processor 203, source code that may be expressed in proper format such as object code that is capable of being loaded into a random access portion of the memory 206 and executed by the processor 203, or source code that may be interpreted by another executable program to generate instructions in a random access portion of the memory 206 to be executed by the processor 203, etc. An executable program may be stored in any portion or component of the memory 206 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 206 is defined herein as including both volatile and nonvolatile memory and data storage components. Volatile components are those that do not retain data values upon loss of power. Nonvolatile components are those that retain data upon a loss of power. Thus, the memory 206 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 203 may represent multiple processors 203 and/or multiple processor cores and the memory 206 may represent multiple memories 206 that operate in parallel processing circuits, respectively. In such a case, the local interface 209 may be an appropriate network that facilitates communication between any two of the multiple processors 203, between any processor 203 and any of the memories 206, or between any two of the memories 206, etc. The local interface 209 may comprise additional systems designed to coordinate this communication, including, for example, performing load balancing. The processor 203 may be of electrical or of some other available construction.

Although the operating system 221, the applications 215, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 6 and 7 show the functionality and operation of an implementation of portions of the processor 203 and the token circuitry 224. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system in a computer system or other system. The machine code may be converted from the source code, etc. If embodied in hardware, each block may represent a circuit or a number of interconnected circuits to implement the specified logical function(s).

Although the flowcharts of FIGS. 6 and 7 show a specific order of execution, it is understood that the order of execution may differ from that which is depicted. For example, the order of execution of two or more blocks may be scrambled relative to the order shown. Also, two or more blocks shown in succession in FIGS. 6 and 7 may be executed concurrently or with partial concurrence. Further, in some embodiments, one or more of the blocks shown in FIGS. 6 and 7 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the operating system 221 and the applications 215, that comprises software or code can be embodied in any non-transitory computer-readable medium for use by or in connection with an instruction execution system such as, for example, a processor 203 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the operating system 221 and the applications 215, may be implemented and structured in a variety of ways. For example, one or more applications described may be implemented as modules or components of a single application. Further, one or more applications described herein may be executed in shared or separate computing devices or a combination thereof. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A mobile device, comprising:
   a shared display between a first circuitry and a second circuitry;
   the first circuitry including a hardware processor and a memory providing general-purpose computing capability;
   the second circuitry configured to generate a one-time password and render the generated one-time password upon a portion of the shared display in response to an input by a user;
   wherein the first circuitry is configured to render a user interface that elicits an entry of the generated one-time password by the user;
   wherein an arrangement of the user interface is based at least in part on a location of the portion of the shared display, or the location of the portion of the shared display is based at least in part on the arrangement of the user interface; and
   wherein the first circuitry is incapable of determining the generated one-time password due to a hardware, communicative, and electrical separation between the first circuitry and the second circuitry, the second circuitry is electromagnetically isolated from the first circuitry via an electromagnetic shield, and the first circuitry and the second circuitry are in a single enclosure of at least one of: plastic, metal, or glass construction.

2. The mobile device of claim 1, wherein the second circuitry includes a button on an exterior of the mobile device that, when activated, provides the input.

3. The mobile device of claim 1, wherein the first circuitry is further configured to provide display configuration information to the second circuitry via a write-only channel, and the second circuitry is further configured to render the generated one-time password based at least in part on the display configuration information.

4. A computing device, comprising:
   a shared display between a first circuitry and a second circuitry;
   the first circuitry including a hardware processor and a memory providing general-purpose computing capability;
   the second circuitry configured to generate a one-time password and render the generated one-time password upon the shared display in response to an input by a user, wherein the first circuitry is configured to render a user interface that elicits an entry of the generated one-time password by the user; and
   wherein the first circuitry is incapable of determining the one-time password due to a hardware, communicative, and electrical separation between the first circuitry and the second circuitry, and the first circuitry and the second circuitry are in a single enclosure of at least one of: plastic, metal, or glass construction, wherein the second circuitry is electromagnetically isolated from the first circuitry via an electromagnetic shield.

5. The computing device of claim 4, wherein the second circuitry is configured to render the generated one-time password upon a predefined portion of the shared display.

6. The computing device of claim 5, wherein the at least one application is configured to render the user interface based at least in part on a location of the predefined portion of the shared display.

7. The computing device of claim 4, wherein the user interface includes a text entry component configured to receive the generated one-time password from the user.

8. The computing device of claim 4, wherein the shared display comprises a first display panel and a second display panel that overlays the first display panel, the first circuitry is configured to render the user interface upon the first display panel, and the second circuitry is configured to render the generated one-time password upon the second display panel.

9. The computing device of claim 4, wherein an electrical trace of the second circuitry is separated from an electrical trace from the first circuitry such that a signal generated by the second circuitry is not readable by the first circuitry.

10. The computing device of claim 4, further comprising a sensor, wherein the second circuitry is configured to render the generated one-time password upon the shared display in response to activation of the sensor by the user.

11. The computing device of claim 4, further comprising a write-only channel that enables the first circuitry to provide data to the second circuitry without being able to read the generated one-time password from the second circuitry.

12. The computing device of claim 11, wherein the first circuitry is configured to execute logic that writes display configuration data for the second circuitry via the write-only channel.

13. The computing device of claim 4, wherein the first circuitry and the second circuitry are powered by distinct power sources.

14. The computing device of claim 13, wherein the second circuitry is coupled to the display by way of an optical waveguide.

15. A method, comprising:
rendering, by first circuitry of a computing device, a user interface configured to elicit text from a user upon a shared display of the computing device;
generating, by second circuitry of the computing device, a one-time password;
rendering, by the second circuitry, the generated one-time password upon a portion of the shared display in response to an input by the user, wherein the user interface configured by the first circuitry elicits an entry of the generated one-time password by the user; and
wherein the first circuitry is incapable of determining the generated one-time password from the second circuitry due to a hardware, communicative, and electrical separation between the first circuitry and the second circuitry, and the first circuitry and the second circuitry are in a single enclosure of at least one of: plastic, metal, or glass construction, wherein the second circuitry is electromagnetically isolated from the first circuitry via an electromagnetic shield.

16. The method of claim 15, wherein the shared display has a first input connection and a second input connection that are separate, the first circuitry is coupled to the first input connection, and the second circuitry is coupled to the second input connection.

17. The method of claim 15, further comprising arranging, by the first circuitry, the user interface upon the shared display based at least in part on a location of the portion of the shared display.

18. The method of claim 15, further comprising:
reading, by the second circuitry, a display configuration value from a memory; and
formatting, by the second circuitry, a visual presentation of the generated one-time password based at least in part on the display configuration value.

19. The method of claim 15, further comprising:
determining, by the second circuitry, that the user has activated a sensor; and
wherein the second circuitry renders the generated one-time password upon the portion of the shared display in response to determining that the user has activated the sensor.

20. The method of claim 15, wherein the shared display comprises a first display panel and a second display panel that overlays the first display panel, the first circuitry is configured to render the user interface upon the first display panel, and the second circuitry is configured to render the generated one-time password upon the second display panel.

* * * * *